US005177851A

United States Patent [19]

Skoworodko

[11] Patent Number: 5,177,851

[45] Date of Patent: Jan. 12, 1993

[54] PULLER FOR BRAKE SLACK ADJUSTER

[76] Inventor: Mike Skoworodko, 540-33255 S. Fraser Way, Abbotsford, B.C., Canada, V2S 2B2

[21] Appl. No.: 818,001

[22] Filed: Jan. 8, 1992

[51] Int. Cl.[5] .......... B23P 19/04

[52] U.S. Cl. .......... 29/257; 29/263

[58] Field of Search .......... 29/256, 257, 258, 259, 29/260, 261, 262, 263

[56] References Cited

U.S. PATENT DOCUMENTS

| | | | |
|---|---|---|---|
| 1,468,334 | 9/1923 | Thomason | 29/260 |
| 2,167,897 | 8/1939 | Kulp | 29/257 |
| 3,846,891 | 11/1974 | Elg | 29/261 |
| 4,235,004 | 11/1980 | Floyd | 29/257 |
| 4,970,771 | 11/1990 | Wood | 29/263 |

*Primary Examiner*—Robert C. Watson
*Attorney, Agent, or Firm*—Townsend and Townsend

[57] ABSTRACT

A puller for a brake slack adjuster having a housing mounted on a mounting shaft and an elongate arm comprising a central portion having a threaded opening alignable with the mounting shaft, a first grasping arm extending from the central portion adapted to straddle and engage the adjuster housing and a second arm extending from the central portion adapted to overlie the adjuster elongate arm. A connecting bolt extendable between the second arm and the adjuster elongate arm is provided to allow for joining of the two arms. A threaded shaft is located in the threaded opening and engages the end of the mounting shaft whereby turning the threaded shaft acts to move the puller relative to the mounting shaft such that the adjuster is pulled from the mounting shaft. In a second embodiment, the central portion is formed with a cup-shaped flange adapted to surround a portion of the member to be removed from the shaft.

4 Claims, 2 Drawing Sheets

PULLER FOR BRAKE SLACK ADJUSTER

FIELD OF THE INVENTION

This invention relates to a device for removing a member from a mounting shaft and is particularly suited for use with pulling a brake slack adjuster from its mounting shaft.

BACKGROUND OF THE INVENTION

Brake slack adjusters are used in trucks and buses and other heavy vehicles to control the adjustment of the air brakes. Generally, the brake slack adjusters comprising a housing mounted on a shaft with an elongate arm extending radially from the housing with respect to the shaft.

Inevitably, the brake slack adjusters wear and must be rebuilt or replaced. Unfortunately, conventional puller devices cannot be used reliably to remove brake slack adjusters due to the adjuster's asymmetrical shape. The adjusters are generally mounted in very inaccessible locations beneath a vehicle and employing a heavy tool, such as a hammer or the like, to force the adjuster from its mounting shaft is difficult, time consuming and frustrating. Furthermore, hammering of the adjuster is not desirable since it can result in damage to the adjuster, mounting shaft and the brake assembly being serviced. Often the only solution is to burn the adjusters off the mounting shaft which is expensive and time consuming and destroys the adjuster making rebuilding impossible.

SUMMARY OF THE INVENTION

The present invention provides a device that allows for quick and simple removal of an adjuster member without damaging the adjuster and permits easy and routine maintenance. The present invention provides a device that is simple in construction, reliable and robust.

Accordingly, the present invention provides a puller for a brake slack adjuster having a housing mounted on a mounting shaft and an elongate arm comprising:

a central portion having a threaded opening alignable with the mounting shaft;

a first grasping arm extending from the central portion adapted to straddle and engage the adjuster housing;

a second arm extending from the central portion adapted to overlie the adjuster elongate arm;

connecting means extendable between the second arm and the adjuster elongate arm to allow for joining of the two arms;

a threaded shaft located in the threaded opening adapted to engage the end of the mounting shaft whereby turning the threaded shaft acts to move the puller relative to the mounting shaft such that the adjuster is pulled from the mounting shaft.

In a further embodiment, the present invention provides a puller for removing a member mounted on a shaft comprising:

a central housing having a threaded opening alignable with the shaft;

a cup-shaped flange extending from the central housing adapted to surround a portion of the member mounted on the shaft;

a threaded shaft located in the threaded opening adapted to engage the end of the mounting shaft whereby turning the threaded shaft acts to move the puller relative to the mounting shaft such that the member is pulled from the mounting shaft by the cup-shaped flange.

BRIEF DESCRIPTION OF THE DRAWINGS

Aspects of the various embodiments of the present invention are illustrated, merely by way of example, in the accompanying drawings in which.

DESCRIPTION OF THE PREFERRED EMBODIMENTS

Figure 1:
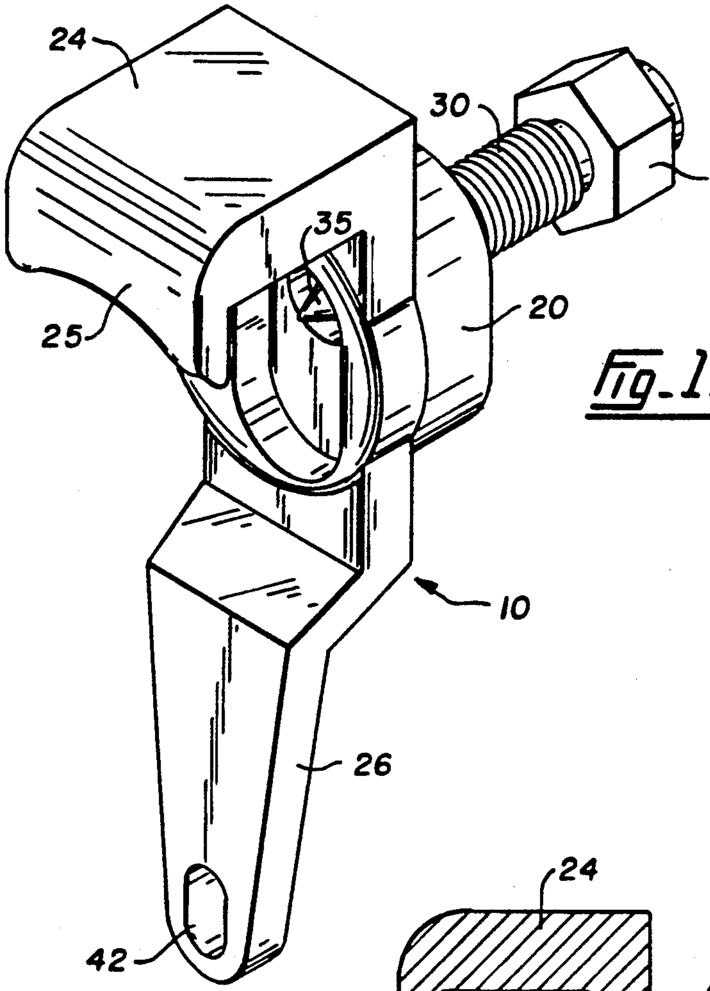
FIG. 1 is a pictorial view of a first embodiment of the puller of the present invention.
Figure 2:
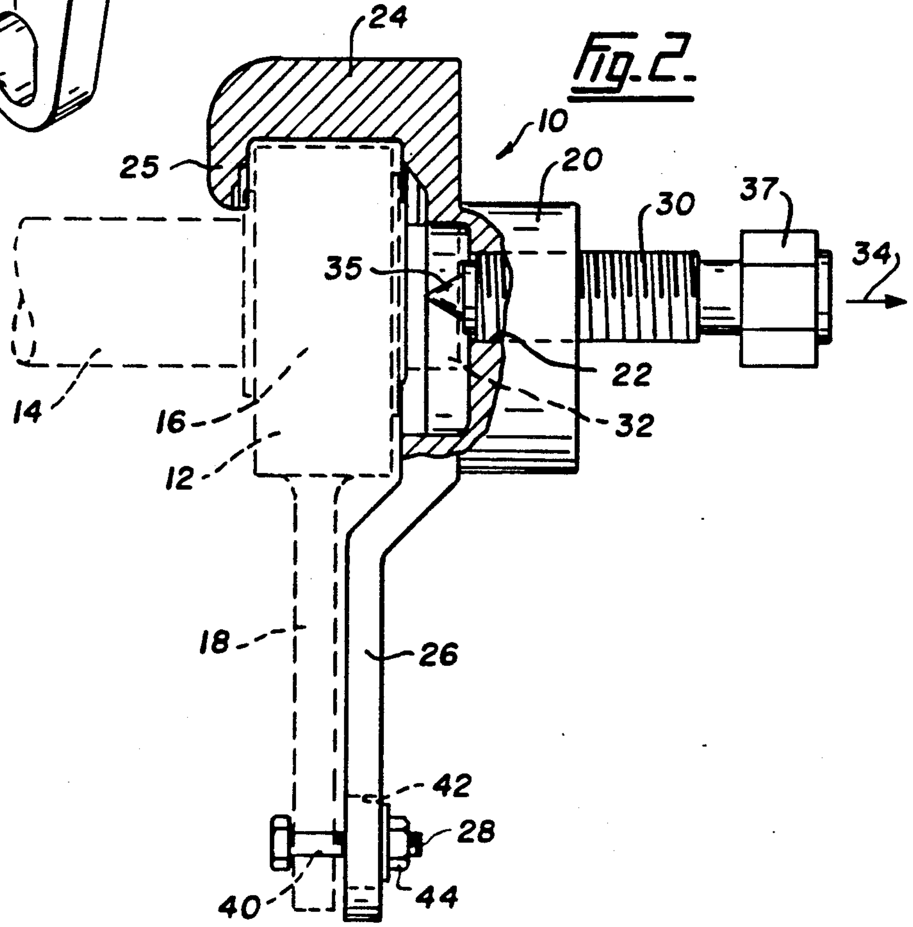
FIG. 2 is a side elevation with cutaway sections showing the puller of FIG. 1 in use with the brake slack adjuster shown in dashed lines.

FIGS. 1 and 2 show a puller 10 according to the present invention for removing a brake slack adjuster 12 from a mounting shaft 14 (shown in dashed lines).

The brake slack adjuster is of conventional configuration and comprises a housing 16 mounted on shaft 14 and an elongate radially extending arm 18. A typical brake slack adjuster is manufactured by Rockwell.

As best shown in FIG. 2, the puller 10 of the present invention comprises a central portion 20 having a threaded opening 22 alignable with the mounting shaft 14. There is a first grasping arm 24 extending from the central portion adapted to straddle and engage the adjuster housing 16. Grasping arm 24 is formed with a flange 25 to engage a face of the adjuster housing. A second arm 26 extends from the central portion opposite the first grasping arm and overlies the adjacent adjuster elongate arm 18.

Connecting means in the form of a threaded bolt 28 are provided between the second arm 26 and the adjuster elongate arm 18 to allow for joining of the two arms. The adjuster elongate arm has an aperture 40 therethrough and second arm 26 is formed with a corresponding aperture 42 therethrough. Threaded bolt 28 is insertable through both apertures and a nut 44 is tightened onto the protruding end of the bolt to join adjuster elongate arm 18 and second arm 26. Preferably, aperture 42 in second arm 26 is a slot to permit quick alignment of the threaded bolt with aperture 40 in the adjuster elongate arm.

There is a threaded shaft 30 located in threaded opening 22 adapted to abut the end 32 of mounting shaft 14. Turning of threaded shaft 30 in a clockwise direction acts to move the puller body relative to mounting shaft 14 in the direction indicated by arrow 34. Grasping arm 24 and second arm 26 connected to the adjuster ensure that the adjuster is pulled from the mounting shaft with the puller body. Preferably, threaded shaft 30 is formed with a conical head 35 that fits within a corresponding cavity centred on the end of the shaft 14 to ensure that the threaded shaft is properly aligned with respect to the mounting shaft. Threaded shaft 30 is also provided with an hexagonal or other suitable driving head 37 to permit easy rotation.

Figure 3:
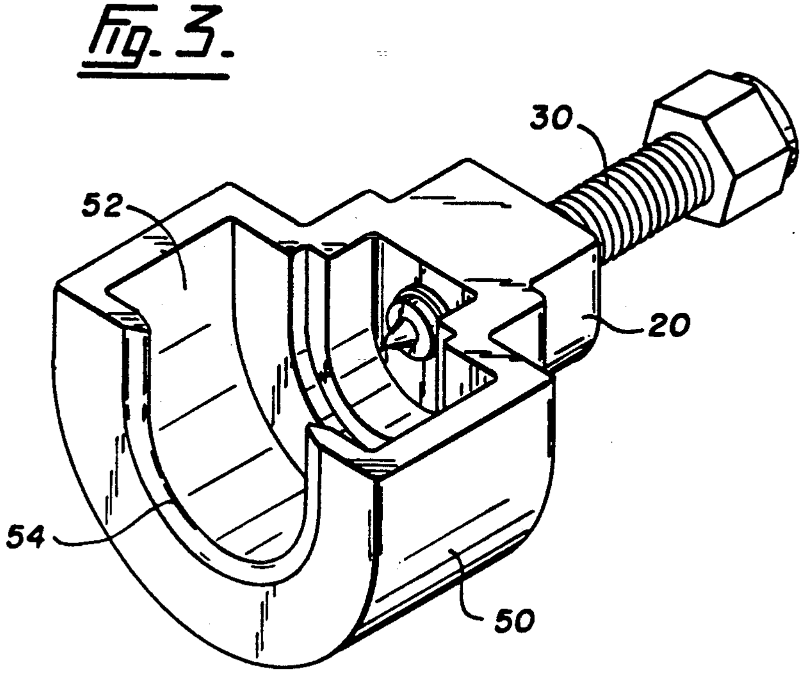
FIG. 3 is a pictorial view of a second embodiment of the present invention that employs a cup-like flange.
Figure 4:
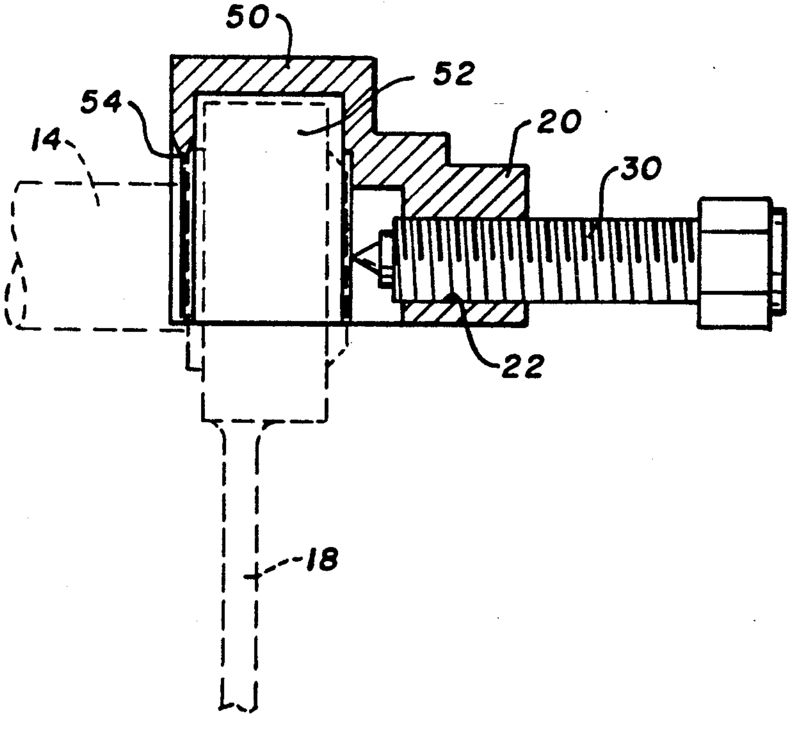
FIG. 4 is a side elevation view with cutaway sections showing the puller of FIG. 3 in use to remove a member from a mounting shaft.

Referring to FIGS. 3 and 4, there is shown an alternative embodiment of the puller of the present invention in which parts similar to those of the first embodiment are indicated by identical reference numerals. In this second embodiment, the puller comprises a central housing 20 having a threaded opening 22 alignable with a shaft 14 on which a member to be removed 18 is mounted. A cup-shaped flange 50 extends from central housing 20. Flange 50 defines a semi-circular cavity 52 adapted to surround a portion of the member to be removed 18. Preferably, an edge 54 of cavity 52 remote from central housing 20 is formed with a narrowed or bevelled edge to assist in positioning the cavity behind a shaft mounted member that is adjacent a fixed surface.

As in the first embodiment, a threaded shaft 30 located in threaded opening 22 serves to engage the end of mounting shaft 14. Turning the threaded shaft acts to move the puller relative to the mounting shaft such that the member 18 is pulled from the mounting shaft by cup-shaped flange 50. It will be appreciated that flange 50 can accommodate a range of sizes of members to be removed as long as the member will fit within cavity 52 to permit edge 54 to engage a surface of member 18 in order to apply a pulling force to the member.

Although the present invention has been described in some detail by way of example for purposes of clarity and understanding, it will be apparent that certain changes and modifications may be practised within the scope of the appended claims.

I claim:

1. A puller for a brake slack adjuster having a housing mounted on a mounting shaft and an elongate arm comprising:

a central portion having a threaded opening alignable with the mounting shaft;

a first grasping arm extending from the central portion adapted to straddle and engage the adjuster housing and formed with a depending flange to engage the adjuster housing in such a manner as to exert a force tending to pull the adjuster housing off the mounting shaft when the puller is in use;

a second arm extending from the central portion adapted to overlie the adjuster elongate arm;

connecting means extendable between the second arm and the adjuster elongate arm to allow for joining of the two arms;

a threaded shaft located in the threaded opening adapted to engage the end of the mounting shaft whereby turning the threaded shaft acts to move the puller relative to the mounting shaft such that the adjuster is pulled from the mounting shaft.

2. A puller as claimed in claim 1 in which said connecting means comprises:

a threaded bolt extending from the second arm to releasably connect the second arm to the adjuster elongate arm in a manner to exert a force tending to pull the adjuster elongate arm off the mounting shaft when the threaded shaft is turned.

3. A puller as claimed in claim 2 in which the adjuster elongate arm has a first aperture therethrough and the second arm is formed with a second aperture therethrough alignable with the first aperture whereby the threaded bolt is insertable through both apertures and a nut is tightened on the protruding end of the threaded bolt to join the adjuster elongate arm and the second arm.

4. A puller as claimed in claim 3 in which the second aperture is a slot to permit alignment of the threaded bolt with the aperture in the adjuster elongate arm.

* * * * *